US009707716B2

(12) United States Patent
Demortiere et al.

(10) Patent No.: US 9,707,716 B2
(45) Date of Patent: Jul. 18, 2017

(54) SELF-ASSEMBLED TUNABLE NETWORKS OF STICKY COLLOIDAL PARTICLES

(71) Applicant: UCHICAGO ARGONNE, LLC, Chicago, IL (US)

(72) Inventors: Arnaud Demortiere, Oak Park, IL (US); Oleksiy (Alexey) Snezhko, Naperville, IL (US); Maksim Sapozhnikov, Nizhny Novgorod (RU); Nicholas G. Becker, Chicago, IL (US); Thomas Proslier, Woodridge, IL (US); Igor S. Aronson, Darien, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 283 days.

(21) Appl. No.: 14/473,003

(22) Filed: Aug. 29, 2014

(65) Prior Publication Data
US 2016/0059483 A1 Mar. 3, 2016

(51) Int. Cl.
| | |
|---|---|
| *B01J 19/08* | (2006.01) |
| *B82Y 40/00* | (2011.01) |
| *B29C 67/00* | (2017.01) |
| *B33Y 10/00* | (2015.01) |
| *B33Y 70/00* | (2015.01) |
| *B29K 63/00* | (2006.01) |
| *B29K 105/24* | (2006.01) |
| *B29K 105/00* | (2006.01) |

(52) U.S. Cl.
CPC ......... *B29C 67/0055* (2013.01); *B01J 19/087* (2013.01); *B33Y 10/00* (2014.12); *B33Y 70/00* (2014.12); *B82Y 40/00* (2013.01); *B29K 2063/00* (2013.01); *B29K 2105/0058* (2013.01); *B29K 2105/24* (2013.01)

(58) Field of Classification Search
None
See application file for complete search history.

(56) References Cited

U.S. PATENT DOCUMENTS

| | | | | |
|---|---|---|---|---|
| 2008/0017845 | A1* | 1/2008 | Drndic | B82B 3/00 257/24 |
| 2012/0104325 | A1* | 5/2012 | Talapin | B82Y 30/00 252/502 |
| 2013/0078469 | A1* | 3/2013 | Winter | B01J 13/04 428/402.24 |

(Continued)

OTHER PUBLICATIONS

Arasa et al., "Anionic copolymerization of DGEBA with two bicyclic bis(y-lactone) derivatives using tertiary amines as initiators," Polymer, 2009, vol. 50, pp. 2228-2236.

(Continued)

*Primary Examiner* — Mary F Theisen
(74) *Attorney, Agent, or Firm* — Foley & Lardner LLP

(57) ABSTRACT

Self-assembled tunable networks of microscopic polymer fibers ranging from wavy colloidal "fur" to highly interconnected networks are created from polymer systems and an applied electric field. The networks emerge via dynamic self-assembly in an alternating (ac) electric field from a non-aqueous suspension of "sticky" polymeric colloidal particles with a controlled degree of polymerization. The resulting architectures are tuned by the frequency and amplitude of the electric field and surface properties of the particles.

20 Claims, 11 Drawing Sheets

(56) References Cited

U.S. PATENT DOCUMENTS

2015/0129793 A1* 5/2015 Ruan .................... C09K 11/025
252/62.54

OTHER PUBLICATIONS

Bannwarth et al., "Well-Defined Nanofibers with Tunable Morphology from Spherical Colloidal Building Blocks," Angewandte Chemie International Edition, 2013, vol. 52, pp. 10107-10111.
Bharti et al, "Co-Assembly of Oppositely Charged Particles into Linear Clusters and Chains of Controllable Length," Scientific Reports, 2102, vol. 2, No. 1004, 5 pages.
Blossey, "Self-cleaning surfaces—virtual realities," Nature Materials, 2003, vol. 2, pp. 301-306.
Demirors et al., "Directed Self-Assembly of Colloidal Dumbbells with an Electric Field," Langmuir, 2010, vol. 26, No. 18, pp. 14466-14471.
Dobnikar et al., "Emergent colloidal dynamics in electromagnetic fields," Soft Matter, 2013, vol. 9, pp. 3693-3704.
Elam et al., "Atomic layer deposition of tin oxide films using tetrakis(dimethylamino) tin," Journal of Vacuum Science & Technology A, 2008, vol. 26, No. 2, pp. 244-252.
Fraden et al., "Electric-Field-Induced Association of Colloidal Particles," Physical Review Letters, 1989, vol. 63, No. 21, pp. 2373-2376.
Ganesh et al., "A review on self-cleaning coatings," Journal of Materials Chemistry, 2011, vol. 21, No. 16304, pp. 16304-16322.
Gangwal et al., "Dielectrophoretic Assembly of Metallodielectric Janus Particles in AC Electric Fields," Langmuir, 2008, vol. 24, pp. 13312-13320.
Gangwal et al., "Programmed assembly of metallodielectric patchy particles in external AC electric fields," Soft Matter, 2010, vol. 6, pp. 1413-1418.
Geissler and Xia, "Patterning: Principles and Some New Developments," Advanced Materials, 2004, vol. 16, No. 15, pp. 1249-1269.
Goldberg-Oppenheimer et al., "Patterning of Crystalline Organic Materials by Electro-hydrodynamic Lithography," Small, 2012, vol. 8, No. 16, pp. 2595-2601.
Gonzalez et al., "Fatty Acid Methyl Esters as Biosolvents of Epoxy Resins: A Physicochemical Study," Journal of Solution Chemistry, 2007, vol. 36, pp. 437-446.
Gryzbowski et al., "Self-assembly: from crystals to cells," Soft Matter, 2009, vol. 5, 1110-1128.
He et al., "Synthetic homeostatic materials with chemo-mechano-chemical self-regulation," Nature, 2012, vol. 487, pp. 214-218.
Kang and Dhont, "Double-layer polarization induced transitions in suspensions of colloidal rods," Europhysics Letters Journal, 2008, vol. 84, No. 14005, 6 pages.
Kim et al., "Shape-Tunable Polymer Nanofibrillar Structures by Oblique Electron Beam Irradiation," Langmuir, 2009, vol. 25, No. 16, pp. 8879-8882.
Kim et al., "Solvent-Assisted Microcontact Molding: A Convenient Method for Fabricating Three-Dimensional Structures on Surfaces of Polymers," Advanced Materials, 1997, vol. 9, No. 8, pp. 651-654.
Kumar and Whitesides, "Features of gold having micrometer to centimeter dimensions can be formed through a combination of stamping with an elastomeric stamp and an alkanethiol 'ink' followed by chemical etching," Applied Physics Letters, 1993, vol. 63, No. 14, pp. 2002-2004.

Lee et al., "Effect of Fiber Geometry on Macroscale Friction of Ordered Low-Density Polyethylene Nanofiber Arrays," Langmuir, 2011, vol. 27, pp. 11008-11016.
Liu et al., "Field-Induced Structures in Ferrofluid Emulsions," Physical Review Letters, 1995, vol. 74, No. 14, pp. 2828-2831.
Luo et al., "Sn-catalyzed synthesis of SnO2 nanowires and their optoelectronic characteristics," Nanotechnology, 2011, vol. 23, No. 485701, 7 pages.
Majidi et al., "High Friction from a Stiff Polymer Using Microfiber Arrays," Physical Review Letters, 2006, vol. 97, No. 076103, 4 pages.
Mann, "Self-assembly and transformation of hybrid nano-objects and nanostructures under equilibrium and non-equilibrium conditions," Nature Materials, 2009, vol. 8, pp. 781-792.
Martin et al., "Using triaxial magnetic fields to create high susceptibility particle composites," Physical Review E, 2004, vol. 69, No. 021508, 15 pages.
Nie and Kumacheva, "Patterning surfaces with functional polymers," Nature Materials, 2008, vol. 7, pp. 277-290.
Nikolic et al, "Fas Fourier Transform IR Characterization of Epoxy GY Systems Crosslinked with Aliphatic and Cycloaliphatic EH Polyamine Adducts," Sensors, 2010, vol. 10, pp. 684-696.
Osterman et al., "Field-Induced Self-Assembly of Suspendid COlloidal Membranes," Physical Review Letters, 2009, vol. 103, No. 228301, 4 pages.
Qin et al., "Soft lithography for micro- and nanoscale patterning," Nature Protocols, 2010, vol. 5, No. 3, pp. 491-502.
Ramirez et al., "Epoxy/POSS organic-inorganic hybrids: ART-FTIR and DSC studies," European Polymer Journal, 2008, vol. 44, pp. 3035-3045.
Ruditskiy et al., "Behaviour of iron oxide (Fe3O4) Janus particles in overlapping external AC electric and static magnetic fields," Soft Matter, 2013, vol. 9, pp. 9174-9181.
Snezhko et al., "Magnetic manipulation of self-assembled colloidal asters," Nature Materials, 2011, vol. 10, pp. 698-703.
Snezhko et al., "Self-Assembled Magnetic Surface Swimmers," Physical Review Letters, 2009, vol. 102, No. 118103, 4 pages.
Talapin and Murray, "PbSe Nanocrystal Solids for n- and p-Channel Thin Film Field-Effect Transistors," Science, 2005, vol. 310, pp. 86-89.
Van Blaaderen, "Colloids under External Control," MRS Bulletin, 2004, pp. 85-90.
Van Den Berg et al., "The Endothelial Glycocalyx Protects Against Myocardial Edema," Circulation Research, 2003, vol. 92, pp. 592-594.
Van Dongen and Ernst, "Dynamic Scaling in the Kinetics of Clustering," Physical Review Letters, 1985, vol. 54, No. 13, pp. 1396-1399.
Vutukuri et al., "Bonding Assembled Colloids without Loss of Colloidal Stability," Advanced Materials, 2012, vol. 24, pp. 412-416.
Vutukuri et al., "Colloidal Analogues of Charged and Uncharged Polymer Chains with Tunable Stiffness," Angewandte Chemie International Edition, 2012, vol. 51, pp. 11249-11253.
Whitesides and Grzybowski, "Self-Assembly at All Scales," Science, 2002, vol. 295, pp. 2418-2421.
Yan et al., "Linking sychronization to self-assembly using magnetic Janus colloids," Nature, 2012, vol. 491, pp. 578-582.
Yu et al., "Mechanical and Superhydrophobic Stabilities of Two-Scale Surficial Structure of Lotus Leaves," Langmuir, 2007, vol. 23, pp. 8212-8216.

* cited by examiner

US 9,707,716 B2

SELF-ASSEMBLED TUNABLE NETWORKS OF STICKY COLLOIDAL PARTICLES

STATEMENT OF GOVERNMENT INTEREST

The United States Government has rights in the invention described herein pursuant to Contract No. DE-AC02-06CH11357 between the United States Department of Energy and UChicago Argonne, LLC, as operator of Argonne National Laboratory.

FIELD OF THE INVENTION

The present invention generally relates to self assembled structures, more particularly to self-assembled tunable networks of colloidal particles.

BACKGROUND OF THE INVENTION

Surfaces patterned with micro-scale fibers are attracting enormous attention for their unique features, including self-cleaning, anti-biofouling, and superhydrophobicity. Materials based on the arrays of flexible synthetic pillars immersed in soft gels exhibit homeostatic self-regulating properties and adaptivity. Most of these patterned surfaces are engineered by top-down methods, e.g. soft lithography. A large number of diverse patterning techniques, which use organic and polymeric materials, including solvent-assisted micro-molding, micro-contact printing, and dip-pen nanolithography, form the basis of contemporary soft lithography.

Design of the non-trivial 3D structures via bottom-up methods such as self-assembly and surface instabilities are highly desirable but technically challenging. For instance, electrohydrodynamic instability may yield 3D patterns at the interface between liquid dielectric materials without a pre-patterned mask. However, the progress is impeded by low controllability and irreproducibility of the emerging structures. External electric/magnetic fields are often used to promote colloidal self-assembly or form colloidal chains in electro- and magneto-rheological fluids along the direction of an applied field. Nontrivial structures can be generated in suspensions of metallo-dielectric patchy and dumbbell particles in external alternating electric or magnetic fields. However, these structures tend to disassemble as soon as the field is turned off unless fixed by crosslinkers. Recently developed methods of thermal annealing of colloidal patterns allow fixing some of the field-generated assemblies of spherical particles. Another promising alternative to the lithographic methods is a dynamic self-assembly occurring in out-of-equilibrium conditions. For example, dynamic self-assembly allows formation of diverse functional structures from suspensions of colloidal particles. The structures, which generally do not exist under equilibrium conditions, include radial magnetic asters, dynamic swimmers, self-healing membranes particle foams, self-assembled micro-tubes, and binary linear clusters.

SUMMARY OF THE INVENTION

One implementation of the invention relates to a method of creating a component. A non-magnetic colloidal mixture of a particles in a liquid dielectric solvent is provided. An alternating current electric field is applied to the mixture. A three-dimensional structure of the first material is formed.

Another implementation relates to a method of creating a component. By providing an epoxy polymer. The epoxy polymer is mixed with a hardener. Cross-linking of the epoxy polymer is initiated. The cross-linking is quenched by mixing the epoxy polymer and hardener with a non-aqueous solvent. A colloid is formed comprising particles of insoluble cross-linked epoxy molecules in the non-aqueous solvent. An alternating current electric field is applied to the colloid. A three-dimensional structure of the particles is formed.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 1a, Reversible self-assembled polymer fibers ("mushrooms") formed at a low degree of polymerization. Array of fibers grows from the electrode surface along the applied ac electric field (50 Hz, 700 V) and form pillars with a pearl at the end. Scale bar is 20 µm. FIG. 1b, Permanent self-assembled polymer brushes ("hair") formed by the sticky particles with a high degree of polymerization in the electric field of 100 Hz, 1 kV. Fibers are comprised of individual particles that form permanently bonded chains along the electric field direction. Scale bar is 20 µm. FIG. 1c, 3D reconstruction of a permanent self-assembled array of polymer fibers from the stacks of 2D confocal images. Fibers densely cover the surface of the electrode. Scale bar is 20 µm. FIG. 1d, Colloidal fur is formed from highly polymerized colloidal epoxy particles in low frequency applied electric field (50 Hz, 800 V shown). Scale bar is 100 µm. FIG. 1e, Retractable polymer fibers form multiple bridges connecting opposite electrodes with ac electric field values of 1 Hz, 1 kV. Scale bar is 100 µm. FIG. 1f, A network of interconnected chains of sticky colloidal particles with a high degree of polymerization is formed for 900 Hz and 700 V. Scale bar is 30 µm. FIG. 1g, A network of bundled chains of sticky particles (gel) is formed at 200 Hz 700 V. Scale bar is 50 µm FIG. 1h, 3D reconstruction of the network of interconnected polymer chains from the stacks of 2D confocal images for the same parameters as in FIG. 1g.

FIG. 2a, Frequency dependence of the fibers' relative length (ΔL/L) (1 kV). FIG. 2b, Relative length (ΔL/L) as a function of the applied voltage, frequency 100 Hz. FIG. 2c, Optical fluorescent images of the fibers at different frequencies. FIG. 2d, Fiber length as a function of time at 1 Hz and 1 kV for short and long "mushroom" fibers. For both fibers, an almost complete reversibility is observed after multiple extension/retraction cycles during 30 minutes. FIG. 2e, Time dependence of the fiber length during formation of the bridges between opposite electrodes, frequency 0.1 Hz.

FIGS. 3A-D illustrate self-assembled structures formed from highly polymerized sticky particles. Scale bar is 50 µm. FIG. 3a, Colloidal fur formed by permanently bonded particles that self-assembled into long wavy chains at low frequencies of the applied field. For these parameters of the ac electric field, hydrodynamic flow is responsible for the formation of wavy structures (50 Hz, 1 kV shown). Scale bar is 100 µm. FIG. 3b, Wavy bundled chains (chevrons) of sticky colloidal particles are formed in a large range of frequencies and voltages and are also affected by the hydrodynamic flow around the chains (300 Hz, 1 kV is displayed). Scale bar is 100 µm. FIG. 3c, Interconnected permanently bonded chains assembled along the electric field at 700 Hz, 1 kV. FIG. 3d, Individual chains of colloidal particles along 1000 Hz, 1 kV electric field.

FIG. 4a-e, Sequence of snapshots illustrating self-assembly of bundled chains from a suspension of sticky particles. Approximately 0.5 s after application of the field (300 Hz, 1 kV), individual particles are absorbed by short chain segments. Scale bar is 50 µm. FIG. 4b-c, Self-assembly proceeds via propagation of the front. Hydrodynamic flow triggers deformation of the bundled chains, which finally form a permanent structure. FIG. 4f, Time dependence of the number of clusters. Initial slow growth of short chains is followed by a fast interconnection event (gelation). The line is a guide for the eye. The arrow indicates the moment when the electric field is turned on. The inset shows the network of close-packed chains. Scale bar is 20 µm. FIG. 4g, Time dependence of the total number of clusters, $N_c$, for 700 Hz and 1 kV. Initial linear increase, corresponding to the formation of individual chains, is followed by the decrease due to fusions and interconnections between the chains. The inset illustrates the decay of the number of single particles. FIG. 4h, Time evolution of the average cluster size. The solid line is a power law fit $\sim t^{0.6}$.

FIG. 5a, SEM image of the polymer wavy chain formed by spherical colloidal particles. Scale bar is 2 µm. FIG. 5b, SEM image of the network of interconnected polymer chains. Scale bar is 50 µm. FIG. 5c, SEM image of the polymer chain formed by permanently bonded colloidal spheres ALD coated with $SnO_2$. Scale bar is 10 µm. FIG. 5d-e, SEM and EDX (Sn L-edge) mapping of individual colloidal particles uniformly coated with $SnO_2$. Scale bar is 1 µm.

FIG. 9A: Dependence of the electrophoretic mobility on polymerization time. FIG. 9B: Number of electrons (Z) per colloidal particle as a function of the polymerization time.

FIG. 11A: Electric conductivity as a function of epoxy reaction time. FIG. 11B: The Debye screening length as a function of epoxy reaction time. The Debye screening length ($\lambda_D$) was estimated from the effective conductivity ($\sigma$) of the media.

FIG. 12a: Storage and loss moduli of the epoxy sample as a function of the polymerization time obtained from the rheological measurements at 10 Hz. FIG. 12b: tan($\phi$), which is the ratio between storage (elastic) and loss moduli as a function of the polymerization time. Low tan($\phi$) values indicate more "liquid"-like behavior, whereas larger values of tan($\phi$) imply more "solid"-like response. Small decrease of tan($\phi$) at low reaction time (around 2 min) is likely related to the shear-thinning effect in the course of large strain oscillatory rheo-measurements.

DETAILED DESCRIPTION OF THE PREFERRED EMBODIMENTS

Figures 1A, 1B, 1C, 1D, 1E, 1F, 1G, 1H:
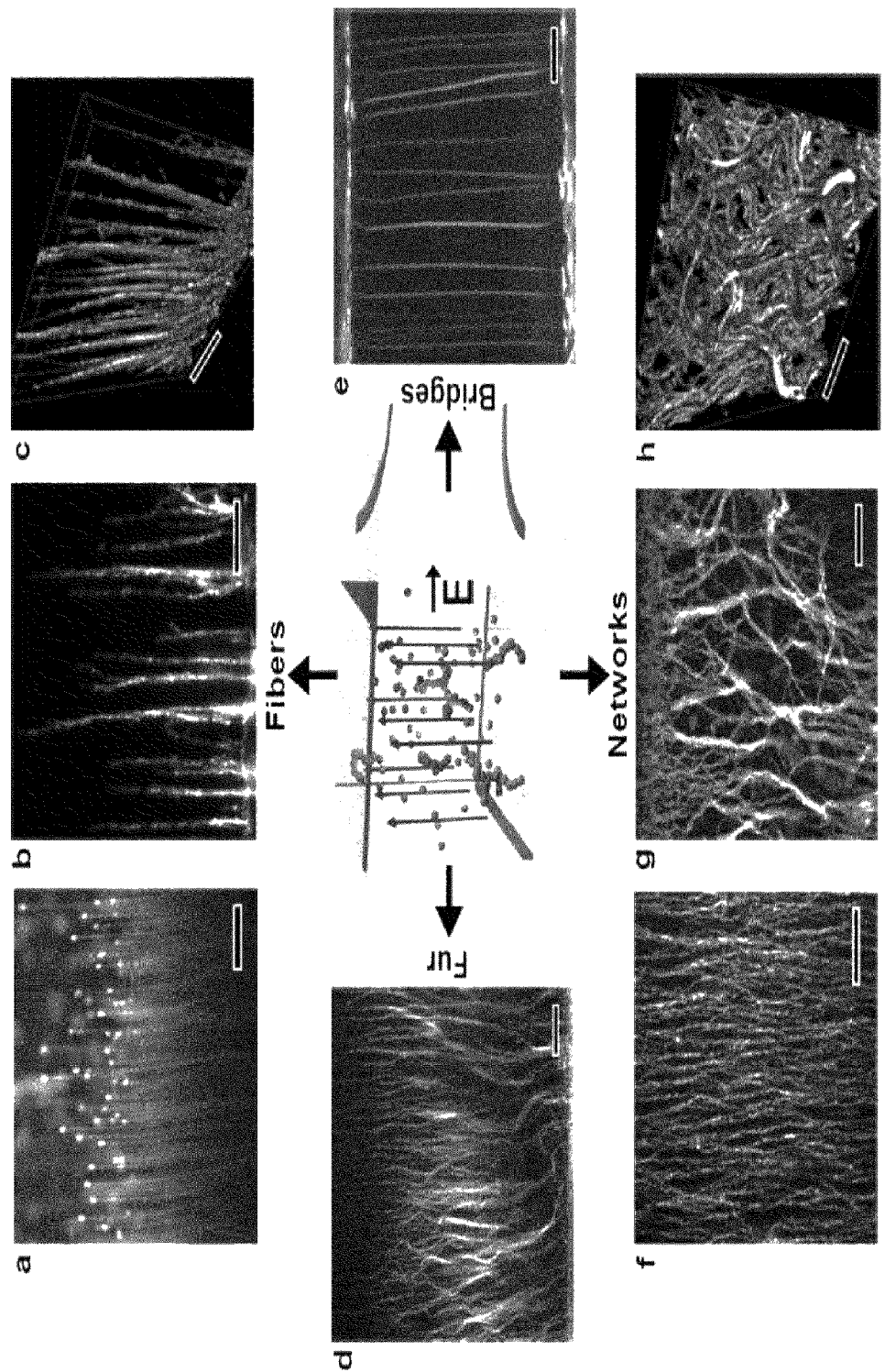
FIGS. 1A-H illustrate self-assembled structures formed by sticky epoxy particles. Scale bar is 20 µm. The image in the center illustrates the schematics of the experiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Described herein are self-assembled tunable networks of microscopic polymer fibers ranging from wavy colloidal "fur" to highly interconnected networks. The networks emerge via dynamic self-assembly in an alternating (ac) electric field from a non-aqueous suspension of "sticky" polymeric colloidal particles with a controlled degree of polymerization. The resulting architectures are tuned by the frequency and amplitude of the electric field and surface properties of the particles. In one implementation, atomic layer deposition, that the networks can serve as a template for a transparent conductor. These self-assembled tunable materials may be for large surface area electrodes in batteries and organic photovoltaic cells, as well as for microfluidic sensors and filters. The particles are, in one implementation, non-magnetic.

As noted, one implementation provides self-assembly of sticky colloidal particles energized by an ac electric field. A system in accordance with the principles of the present invention generates permanent and tunable structures that can be used as templates for 3-D fabrication. One implementation includes a system comprised of a colloidal suspension of epoxy polymer/hardener. It should be appreciated that, in general, any two component polymer systems capable of crosslinking upon contact could be usable. The polymer system is mixed with a dielectric organic solvent (for example, but not limited to toluene) confined in a thin electric cell. The suspension is energized by a uniaxial alternating electric field (see methods described below). In certain implementations, for example those described in the examples herein, the AC field must be uni-axial. The field also provides a convenient mean to control the emergent architectures. In a further implementation, the resulting behavior of the emergent architectures is further tuned by varying the polymerization time of epoxy polymer/hardener mixture before the solvent, quenching the polymerization, is introduced.

Figures 2A, 2B, 2C, 2D, 2E:
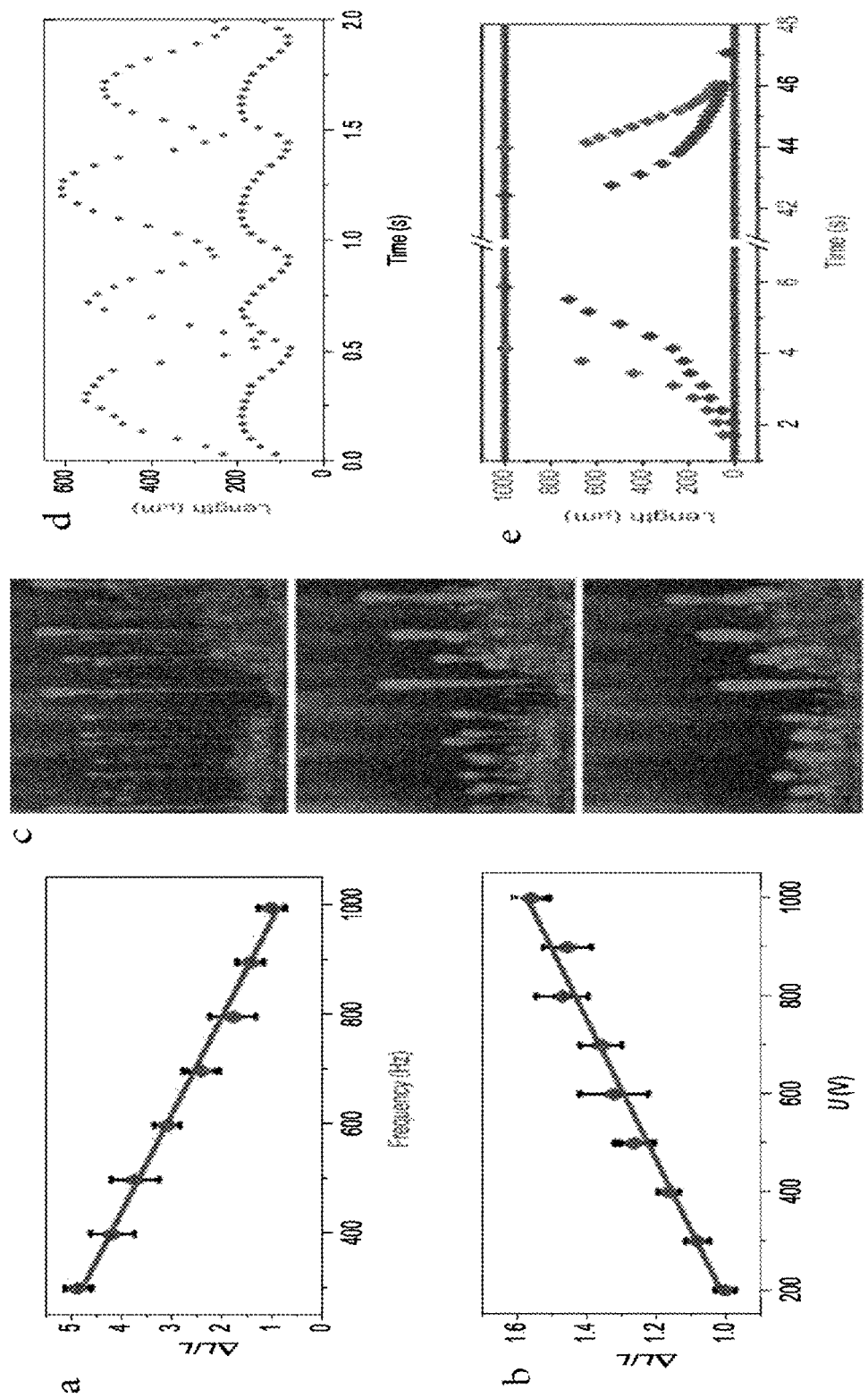
FIGS. 2A-E illustrates a retractable fibers forming from liquid-like particles with low degree of polymerization.

In one implementation, compositions, systems and methods of the present invention provide tunable liquid-like fibers comprised of particles with a low degree of polymerization. These particles reversibly extend and retract in response to the ac electric field. Reversibility is a preferred characteristic for the polymer system in certain implementations but not required a feature. Typically, reversibility occurs at low polymerization regimes. The growth of these fibers proceeds via successive coalescence of the colloidal droplets connected to the electrode. The droplets, moving in response to the electric field, form mushroom-like pillars with a distinctive pearl at the tips (as shown in FIGS. 1a, 2c). It is believe that all compositions with a similar polymerization regime would behave similarly. FIG. 2a,b illustrates the frequency and voltage dependence of the fibers' relative length ($\Delta L/L$). The trend for both dependences is close to linear: the fibers' length increases with the increase of the applied voltage and with the decrease of the frequency. Optical fluorescence images of the fibers at different frequencies are shown in FIG. 2c. Being fully reversible, the pillars periodically extend and retract at low frequency (1 Hz) of the ac field, see FIG. 2d. Bridges (1000 µm long fibers) traversing the electrodes of the cell are formed upon application of longer voltage pulses, FIG. 1e. The rate of bridge formation depends on the amount of locally available colloidal material, FIG. 2e. That is, generally more bridges will be formed per unit time in systems with higher concentration of colloids.

Figures 3A, 3B, 3C, 3D:
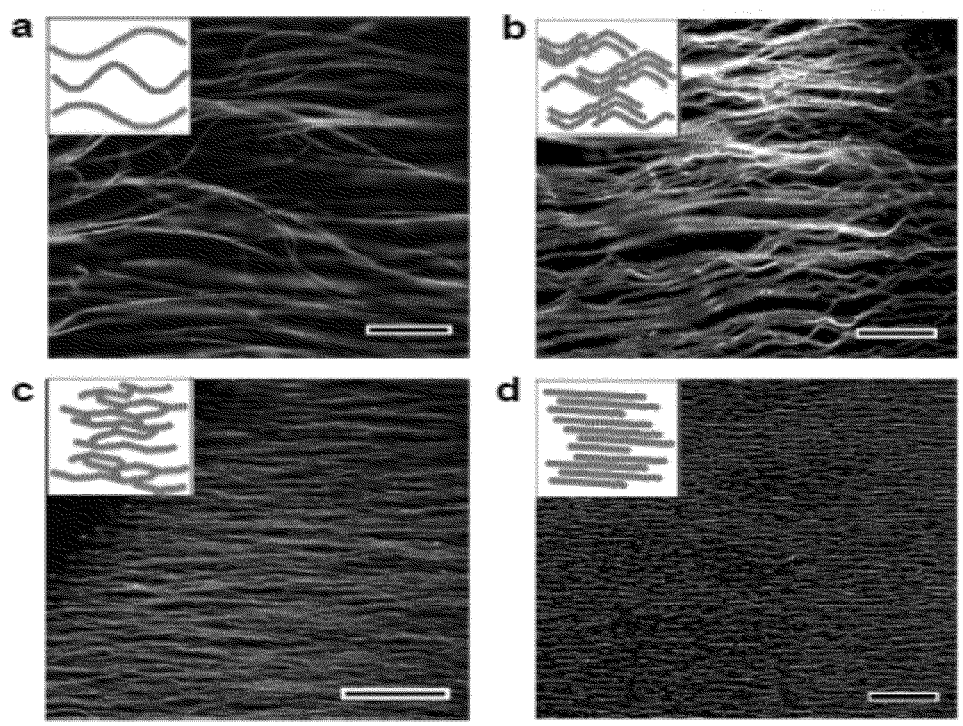
Figures 4A, 4B, 4C, 4D, 4E, 4F, 4G, 4H:
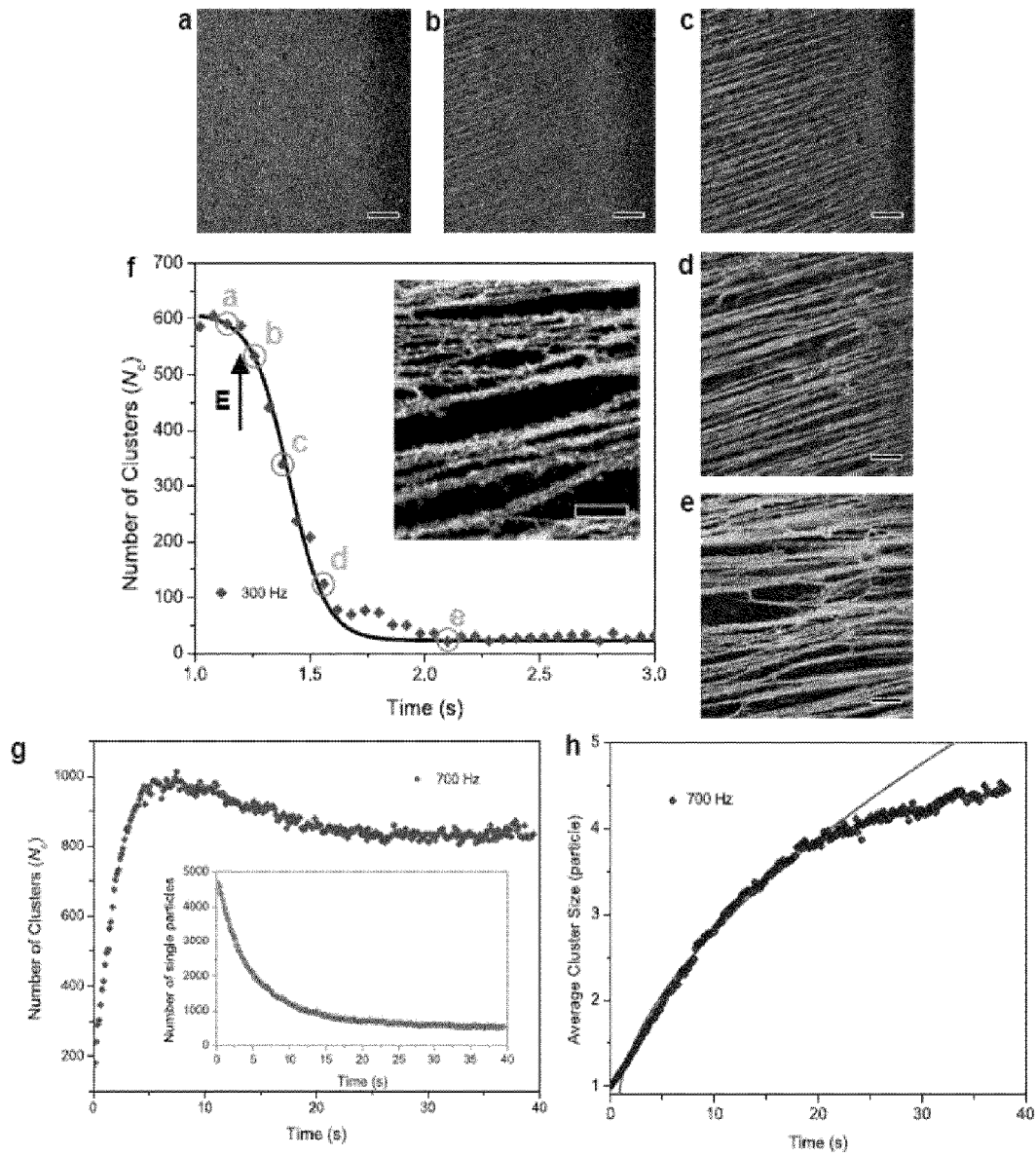
FIGS. 4A-H illustrate bundled individual and interconnected chains of sticky particles at 300 and 700 Hz.

Sticky colloidal particles, comprised of epoxy droplets of a higher degree of polymerization, exhibit a surprisingly rich morphology of permanent fibrous structures formed in an ac electric field. With the increase in the frequency of the ac field, bundled wavy fibers, formed in the conditions where hydrodynamic flows are important, give way to highly interconnected single-particle thick networks (FIG. 3c), and then to parallel chains of permanently bonded particles (FIG. 3d). At lower frequency, the hydrodynamic flow can dominate the impact of the AC field. Generally, the transition is linear and a smooth transition is seen from the hydrodynamic flow dominating to the impact of the AC field dominating as frequency increases. Hydrodynamic flow of the solvent is negligible in the later cases. The dynamics of the bundled phase is rather nontrivial. Upon application of the ac electric field, particles self-assemble into parallel chains oriented along the field direction. Then the onset of the hydrodynamic flow takes place and the system forms bundles of wavy chains.

FIGS. 4a-e illustrate consecutive formation of bundled chains starting from a single-particle sticky colloidal suspension. Time evolution of the number of clusters (chain segments) for the frequency of 300 Hz is shown in FIG. 4f. Initially slow growth of short chains is replaced by a fast interconnection event (gelation transition, around 1 sec in the graph). Gelation results in a formation of giant clusters comprised of long bundled chains spanning both electrodes. The dynamics can be further tuned by the frequency. Time evolution of the number of clusters $N_c$ (chain segments containing at least two colloidal particles) at 700 Hz is shown in FIG. 4g. For this frequency a complete gelation does not occur. The initial increase of $N_c$ corresponds to the formation of permanent individual chains that are aligned along the field direction. The initial trend is close to a linear law. That differs from the known exponent for the average chain length $\zeta=0.6$ because the monomers (single particles) are excluded from the analysis. According to the Smoluchowski coagulation theory, the initial growth of the multiparticle clusters from a single-particle state is linear. Then, the curve exhibits a decrease in $N_c$ corresponding to the onset of fusion and interconnections between the chains. The inset to FIG. 4g confirms that the number of single particles decay with time. Evolution of average cluster size vs. time is shown in FIG. 4h. In this case the behavior is consistent with a power law with the exponent $\zeta=0.6^{36}$, although the scaling interval is relatively short due to limited statistics. Similar behavior is observed for higher frequencies. However, the overall self-assembly time-scale increases with the increase in frequency, likely due to the decrease of the double layer polarization. The frequency f of the gelation transition can be estimated from the characteristic time $t_0$ for the ions in solvent to diffuse a distance of the order of the Debye length $\lambda_D \sim 2\text{-}2.5$ µm, i.e. $f_0=1/t_0=D/\lambda_D^2 \sim 250\text{-}300$ Hz (where $D \sim 10^{-9}$ m$^2$ s$^{-1}$ is the ion's diffusion, see examples below). Above this value polarization of the double layer becomes small, resulting in attenuation of the inter-particle dipolar interaction. Furthermore, the flows induced by particles' oscillations in the ac field that are responsible for the formation of fur and bundled chains subside with the increase of the frequency. {can the "flows" be characterized or further described} Using measured values of the electrophoretic mobility $\mu \sim 3\text{-}4 \times 10^{-10}$ m$^2$v$^{-1}$ and applied electric field $E=10^6$ V m$^{-1}$ (see Methods), the frequency, f, can be estimated when the induced flows become negligible, i.e. when the displacement is comparable to the particle radius R, yielding $f_c = \mu_e E/(2\pi R) \cdot 50\text{-}60$ Hz. This range is in good agreement with the onset of "fur" formation at 50 Hz.

Figures 5A, 5B, 5C, 5D, 5E:
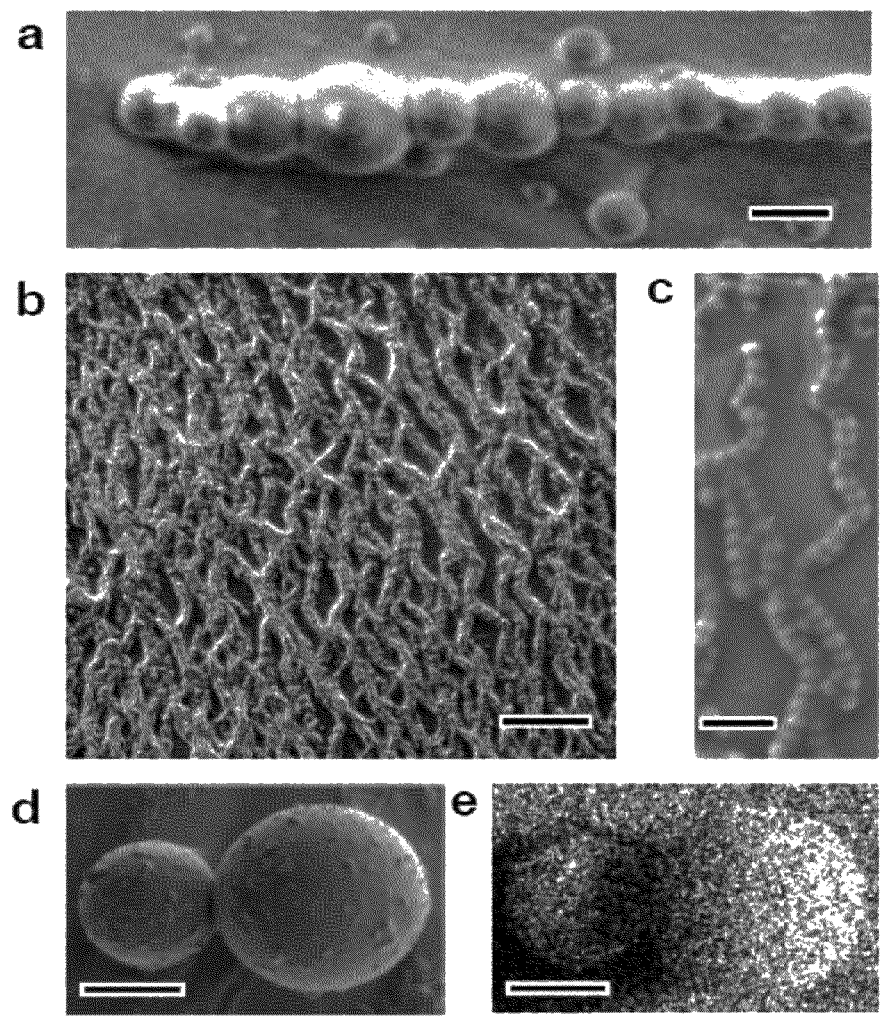
FIG. 5A-E illustrates a SEM study of polymer colloidal chains coated by $SnO_2$ using atomic layer deposition.

Upon removal of the ac electric field, the particles remain in mechanical contact to each other and the total structure stays intact. The mechanical contacts between the individual particles in the chain were confirmed by scanning electron microscopy (SEM) studies (described further below). FIGS. 5a,b show SEM images of a self-assembled chain and a network comprised of the spherical epoxy particles bonded together. Epoxy colloidal particles have a tendency to partially interpenetrate each other during the assembly process, creating tight mechanically stable bonding that survives capillary forces during solvent evaporation.

In order to functionalize the self-assembled structures, ALD was employed to coat the polymer surface of the networks with a thin layer (12 nm) of tin oxide ($SnO_2$). This coating was chosen for its ease of deposition and potential applications in optoelectronics and sensors. SEM images of polymer chains in the network and individual particles that are coated with SnO$_2$ are shown in FIG. 5. Thermal stability of the epoxy allowed preservation of the self-assembled structures during the deposition cycles in the ALD chamber at 100° C. An energy-dispersive X-ray (EDX) mapping of Sn was performed (further described below) on individual colloidal particles, FIG. 5e. The mapping confirmed uniform coating of the networks with SnO$_2$. Thus, it has been shown that the self-assembled networks of sticky polymer colloidal particles can be used as a low-cost alternative for 3D templating.

As demonstrated by the examples below, sticky polymer colloids in non-aqueous solution form a variety of self-assembled structures, ranging from tunable fibers and bridges to permanent colloidal "fur" and networks of interconnected, bundled chains. The morphology of these self-assembled structures is controlled by the parameters of the applied electric field and the degree of epoxy polymerization. Although exact numeric relationships may different for different systems (polymers-media), general rules are established for the relationship between morphology and characteristics of the system/methods. For instance, high polymerization, high frequency yields chains; high-polymerization low frequency yields "hairs", etc. The low frequency can be approximately defined as frequency well below $f_0=D/\lambda^2$. Here D is the ion diffusion in the media and $\lambda$ is a Debye screening length of the media. The high frequency regime can be defined as frequency above $f_0=D/\lambda^2$. A low degree of polymerization system is defined as where the polymerization is sufficiently low that the system behaves as a liquid, that is it exhibits an absence of (or only negligible amount of) elasticity. A high degree of polymerization is where the polymerization is sufficiently high that the system behaves as a solid, that is it exhibits elasticity. The described preferred approach is a low-cost alternative to more traditional lithographic techniques. Self-assembled networks of sticky polymer colloids can be further functionalized by the means of ALD and can be used in a wide range of applications where a large surface to volume ratio is needed, such as electrodes in lithium batteries, photovoltaic cells, sensors and filters.

Implementations of the present invention form various structures. One aspect forms bone-like structures: self-assembled networks of sticky colloids can fill the space in-between surfaces to provide mechanical stability. Another aspect forms colloidal fibers made of sticky colloids during self-assembly can cover any object placed in the cell. This process can be used to protect the object of interest from tear and wear OR modify the friction. Another aspect forms magnetic nano-particles can be mixed inside sticky colloids to create additional knob of control (magnetic field) over out-of-equilibrium self-assembly. For instance, such colloids could be used to create networks with preferable axis of anisotropy (i.e fibers will be more aligned in one directions). Another aspect forms conductive polymer can be used to form a conductive 3D network directly in contact with an electrode, which yields an interesting architecture for designing Li-ion battery electrode.

Methods

Colloidal particle synthesis. The precursor was prepared by macroscopic mixing for 1 min of 100 mg of epoxy polymer (bisphenol A diglycidyl ether) and 100 mg of hardener (2,4,6-tris[(dimethylamino)methyl]phenol). Colloidal solutions were made by quenching the polymerization with toluene (anhydrous, water<0.2%) as the solvent and with rhodamine-B-isothiocyanate (RBI) as a tracer dye. 200 µL of toluene/RBI (1 mg of RBI) solution was introduced in 40 mg of polymer/hardener mixture at a specific time, which is defined as the "polymerization" time, usually in the range from 1 to 5 min measured from the precursor formation. Humidity of the environment was around 60%. Both epoxy polymer and hardener are soluble in toluene, though the hardener has a higher solubility in toluene than the epoxy polymer.

The mechanism of colloid formation from the epoxy/hardener mixture in toluene is as follows: upon mixing both components (epoxy polymer and the hardener), cross-linking is initialized in multiple random locations of the mixture, giving rise to multiple nuclei of a cross-linked phase. The mixture turns solid after 10 minutes. The fully cross-linked phase is insoluble in toluene. Placing the polymer/hardener mixture into toluene solvent before a complete cure quenches further cross-linking, and remaining free epoxy and hardener molecules are transferred to the solvent. Consequently, a suspension of microscopic particles comprised of insoluble partially cross-linked epoxy molecules is formed. Average particle size is determined by the time the mixture was exposed to crosslinking before the introduction of the solvent (toluene).

Fourier transform infrared spectroscopy (FTIR) was used to characterize the degree of polymerization of epoxy colloidal solutions at different polymerization times. The degree of crosslinking between epoxy polymer and hardener was investigated in the middle range of IR light (Nicolet FTIR spectrometer 6700). The measurements were carried out on three epoxy colloidal samples (using liquid transmission cells with KBr windows) prepared at 1, 3 and, 5 minutes of polymerization time. Each sample was used after waiting 10 min to allow sedimentation of oversized colloidal particles.

Figures 6A, 6B, 6C, 6D, 6E, 6F:
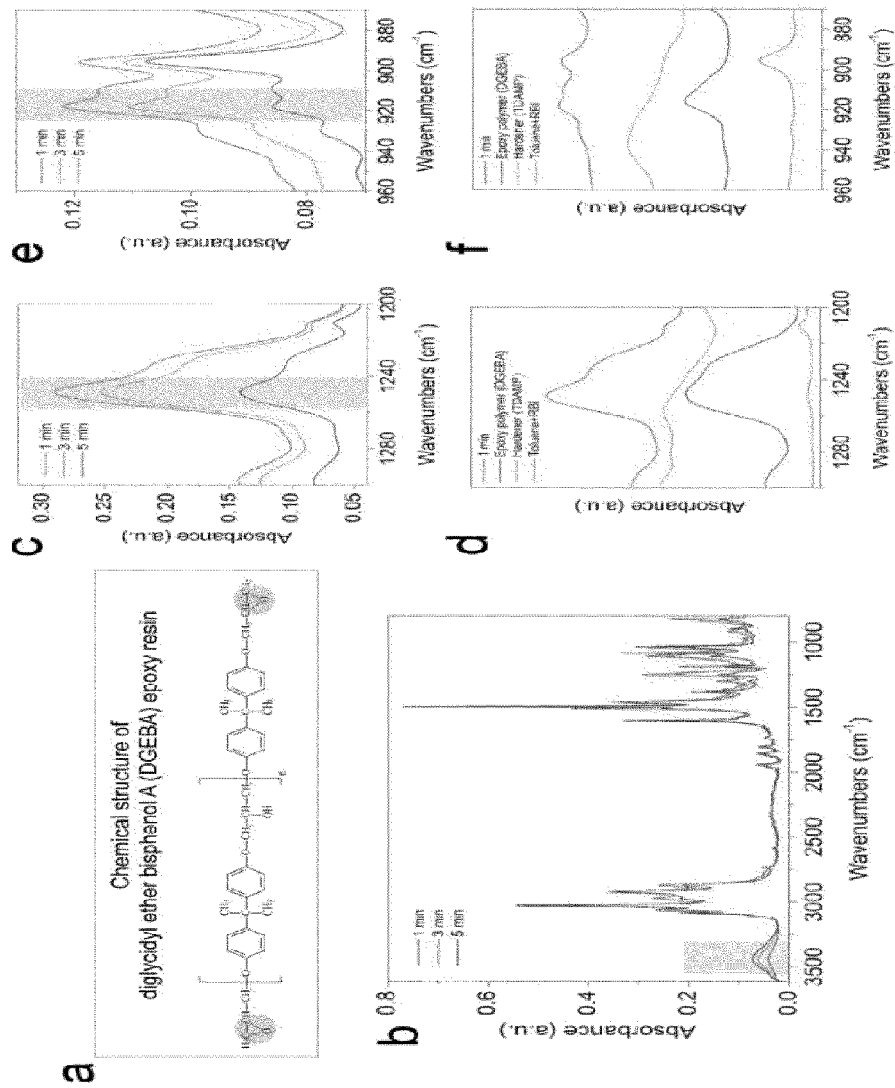
FIGS. 6A-F show a Fourier transform infrared spectroscopy of epoxy colloidal suspension. (a) Sketch of chemical structure of the epoxy resin with two oxirane groups highlighted. (b) The FTIR spectra of epoxy samples after 1, 3 and 5 minutes polymerization time measured using a liquid cell. The spectra exhibit broad bands around 3400 $cm_{-1}$ indicating formation of OH groups. (c) and (e) The FTIR spectra reveal a decrease in the amplitudes of the peaks, at 1250 $cm_{-1}$ and 918 $cm_{-1}$ with an increase in the polymerization time. (d) and (f) The FTIR spectra for epoxy/harder mixture after 1 min of polymerization (orange), epoxy polymer (blue), hardener (yellow), and toluene/RBI (green) in the same wavenumber range as in panels c and e. The corresponding spectra were shifted vertically in order to emphasize contributions of each component in the sample to FTIR absorption signal.

Two well-resolved characteristic absorption bands of the oxirane group, which are impacted by the crosslinking process, are observed in the middle IR (see FIG. 6). The first band, centered at 918 cm$^{-1}$, is attributed to the C—O—C asymmetric stretching of the oxirane group. The second band is centered at approximately 1250 cm$^{-1}$ and is attributed to the C—O—C symmetric stretching of the oxirane group. The FTIR spectra were normalized to 1608 cm$^{-1}$ which is the band corresponding to C=C stretching of the aromatic rings. The changes in these two bands at 918 cm$^{-1}$ and 1250 cm$^{-1}$ reveal the opening of the epoxy oxirane rings during crosslinking. The IR spectra also display a pronounced broad band around 3400 cm$^{-1}$, indicative of formation of the OH groups when crosslinking has occurred. The FTIR analysis confirms that toluene quenches the crosslinking processes. Consequently, particles with a different degree of polymerization are formed depending on the time when the toluene was introduced (see FIG. 6 for the FTIR spectra). It is worth noting that the FTIR bands corresponding to H$_2$O molecules are not observed, which indicates absence of moisture absorption by the colloidal samples.

Figure 7:
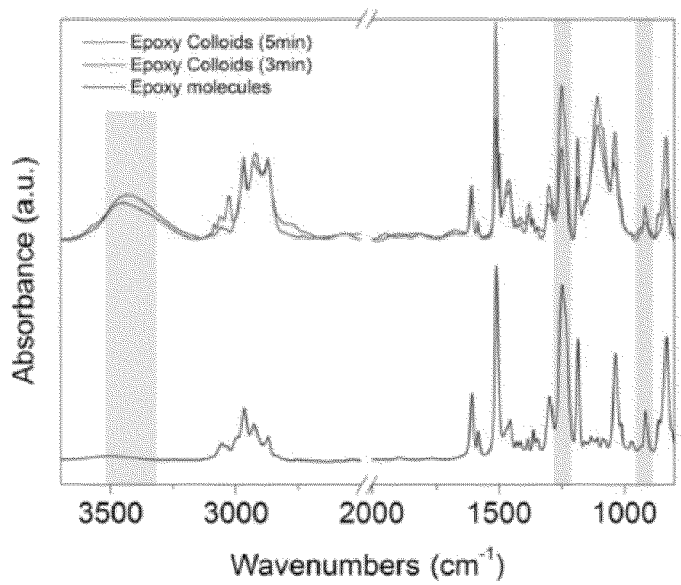
FIG. 7 shows FTIR analysis of washed epoxy colloidal particles. The FTIR spectra of purified epoxy colloidal particles synthesized at 3 and 5 minutes of polymerization time (red and green, respectively) and pure epoxy molecules (DGEBA) (blue). The blue bar depicts the broad band around 3400 $cm_{-1}$ indicating formation of the OH groups in the course of crosslinking. Red bars highlight two bands at 918 $cm_{-1}$ and 1250 $cm_{-1}$, which are attributed to the presence of active epoxy groups.

In order to gain an insight into "sticky" properties of epoxy colloidal particles, the initial reaction solution was washed to extract epoxy colloidal particles and discard free epoxy and hardener molecules. The colloidal solution was prepared with 200 µL of Toluene/RBI solution mixed with 40 mg of blended epoxy/hardener mixture for different times of polymerization (3 and 5 min). After waiting 10 min for sedimentation (to separate oversized particles), 150 µL of the colloidal suspension was extracted and re-dispersed in 200 µL toluene, gently centrifuged (500 rpm, 10 min), and 200 μL of the media was discarded. This procedure was repeated three times to guarantee an effective purification. The FTIR analysis confirmed that epoxy colloidal particles themselves contain both cross-linked epoxy and active uncross-linked epoxy groups (FIG. 7).

Figure 8:
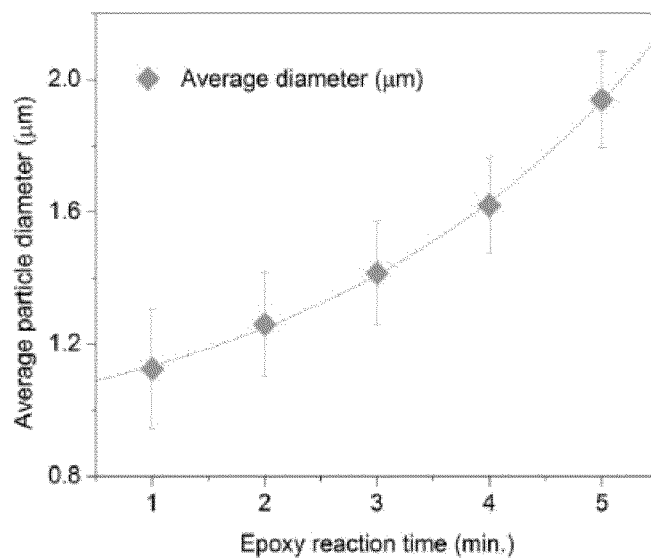
FIG. 8 shows average size of epoxy colloidal particles. Average diameter of epoxy colloidal particles labeled with RBI in toluene solvent as a function of polymerization time (minutes) obtained from 2D fluorescent images with an excitation wavelength of 568 nm.

Oversized colloidal particles were separated by 10 min of sedimentation in toluene before the use of the resulting suspension in the electric cell. Particles with low polymerization time (1 min) had an average size of 1.12 μm with size polydispersity of 32% (from light scattering and optical microscopy measurements), whereas particles at high polymerization time (5 min) had a size of 1.94 μm and size polydispersity of 15% (see FIG. 8).

The electric cell was comprised of two 100 μm thick copper electrodes glued to a microscope glass slide at a distance of 1 mm and covered with a 0.1 mm thick glass cover slip to form a channel. After a colloidal suspension was introduced into the cell, it was sealed on both sides by Super Silicone Sealant™, 3M. The amplitudes of a single axis ac electric field applied to the cell were in the range from 10 to 1000 V and the frequencies from 1 mHz to 1 MHz.

Figures 9A, 9B:
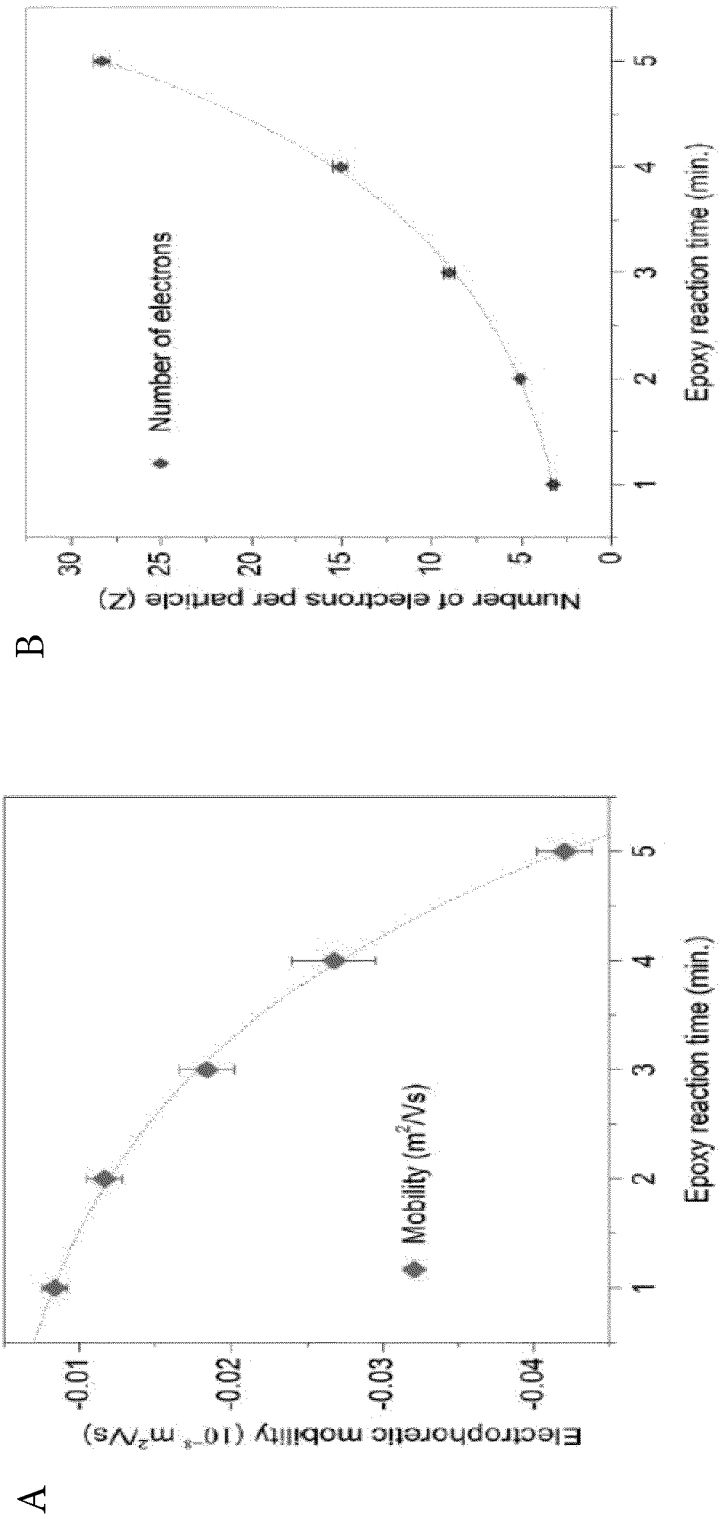
FIGS. 9A-B show electrophoretic mobility and charge of epoxy colloidal particles.
Figure 10:
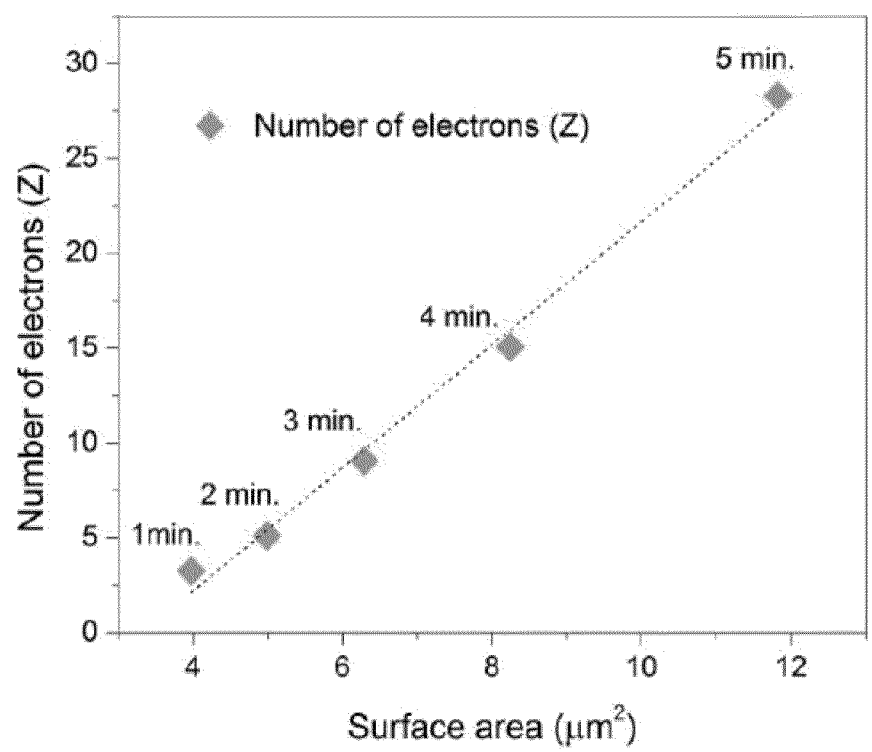
FIG. 10 shows charge of epoxy colloidal particles as a function of surface area. The surface area dependence of number of electrons per colloidal particles exhibits a linear trend.

The particle charge at different degrees of polymerization was determined by means of electrophoretic measurement (zeta-potential analyzer Malvers Nano-ZS) in toluene/RBI mixture. The charge (Z) per particle from the electrophoretic mobility ($\mu_e$) was identified using the relation $Ze=6\pi\eta\mu_e$ where R is the particle radius, η is the solvent viscosity ($\eta=5.9\times10^{-4}$ Pa·s) and e is the electron charge. Average charge per particle Z in electrons varies from 3.3 for 1 min polymerization time to 28.3 for 5 min (FIG. 9). For fixed polymerization time, the charge on a colloidal particle is proportional to its surface area (FIG. 10).

Figures 11A, 11B:
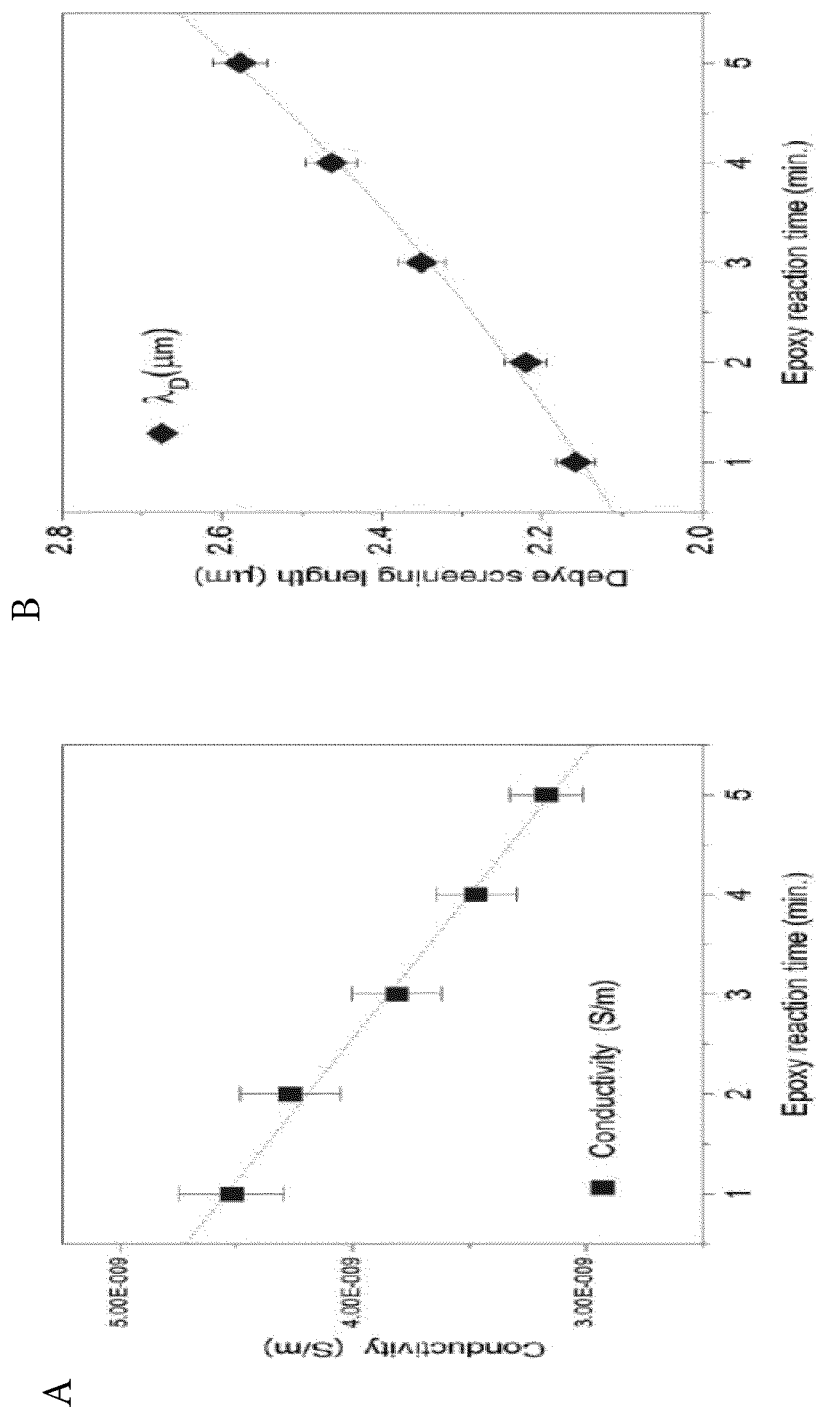
FIGS. 11A-B show electrical conductivity and Debye screening length of epoxy colloids.

The Debye screening length ($\lambda_D$) was estimated from measurements of the solvent conductivity (σ) (toluene/RBI mixture) in the presence of colloidal particles; a single ionic charge was assumed for simplicity. The Debye length was determined as $\lambda_D=(\epsilon_0\epsilon_r D/\sigma)^{1/2}$, where D is the ion diffusion coefficient ($D=10^{-9}$ m$^2$/s is a representative value for ion diffusion) and σ is the conductivity of the solvent. The Debye screening length was estimated to be of the order 2 μm with a slight change from 2.15 to 2.57 μm with the increase of the polymerization time from 1 to 5 min (see FIG. 11).

Figures 12A, 12B:
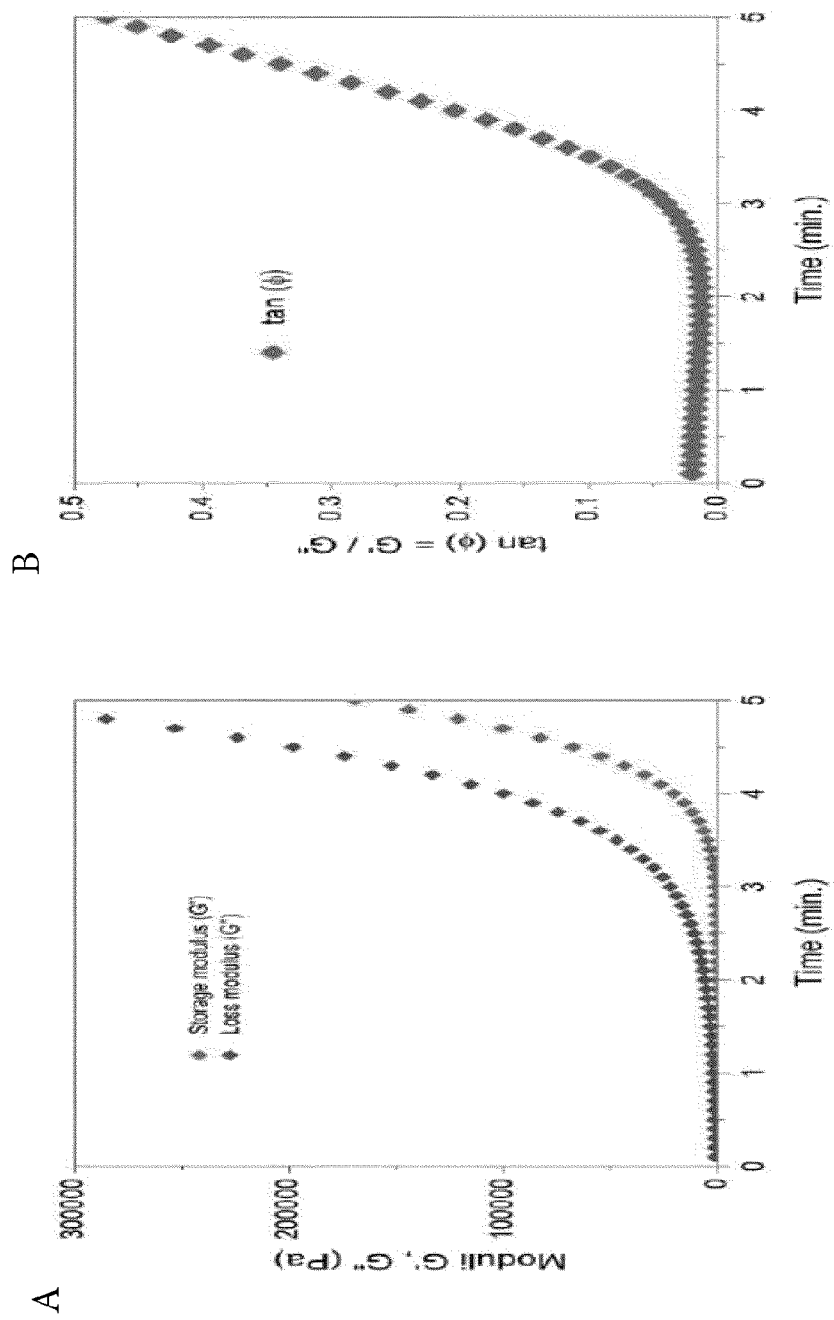
FIGS. 12A-B show visco-elastic properties of bulk epoxy samples.

Visco-elasticity properties of the epoxy polymer was investigated by the means of rheological measurements using an Anton Paar Physica MCR 301 rheometer. Oscillatory and rotational mode was used with a frequency of 10 Hz and strain amplitude of 5% at 25° C. and measured the loss and storage moduli as a function of the polymerization time in the macroscopic epoxy/hardener mixture (no solvent) at different polymerization times (see FIG. 12). A mixture with a low degree of polymerization (1 min) has a viscosity of 33.3 Pa·s and an elasticity of 1.6 Pa·s. A higher polymerization (5 min) mixture was observed to have a viscosity and elasticity of 5.7 and 2.7 kPa·s respectively. The ratio between storage (elastic) and loss (viscous) moduli, tan(φ), as a function of polymerization time revealed a transition from liquid-like (low tan(φ) values) to solid-like behavior (high tan(φ) values) in around 2.5 minutes (see FIG. 12).

Confocal microscopy was performed with an Olympus DSU spinning disc confocal module mounted on an Olympus BX61 microscope, equipped with a Hamamatsu EM-CCD C9100 digital camera and LMplanFluorN ×10 and LMplanFluorN oil immersed ×60 objectives (Olympus). Fluorescence excitations for RBI-labeled colloids with wavelength of 568 nm were used. 2D images were captured at 1024×1024 resolution. For the 3D data reconstruction stacks of 2D images spaced at 0.5 μm apart were recorded. Image and data analysis was performed by ImageJ software and custom scripts.

Scanning electron microscopy (SEM) imaging was performed on a JEOL 7500 setup equipped with an EDX detector for chemical analysis. The EDX measurements were carried out in the mapping mode for Sn L-edge signal on the networks of polymer colloidal chains coated with $SnO_2$ by ALD.

Atomic layer deposition. $SnO_2$ film was synthesized by ALD following a previous recipe in the growth chamber of a commercial ALD system (SavannahS100 from Cambridgenanotech). The growth was performed in the self-limiting regime at 100° C. by pulsing sequentially Tretrakis(demethylamino)Tin (TDMASn) as the Sn source and hydrogen peroxide (H2O2) (35% in water) as the oxygen source. The TDMASn precursor was held at 40° C. in a stainless steel Swagelok cylinder during the deposition. The pulse and purge sequence for the TDMASn and H2O2 was as follows: 0.4 s-60 s and 0.1 s-60 s, respectively, constitute one deposition cycle. After 125 deposition cycles, the substrates were removed from the ALD chamber and the film thickness was measured with an ellipsometer (model α-SE from Woollam) on witness silicon pieces placed around the microscope glass. The film thickness (12 nm) was uniform within 1% and had a growth rate of 1.0 Å per cycle. This chemistry was selected based on its large ALD window and low temperature range: from 50° C. to 300° C., which is compatible with the stability temperature range of most polymers. A large variety of films thickness and composition can be deposited by ALD, providing that the polymer structures can resist the deposition temperature. For example: Low temperature deposition (<250 C): Oxides (Al2O3, MnO, Fe2O3, TiO2, ZnO, MgO), sulfides (ZnS, FeS), metals (W, Mo, Pt, Ir), silicides (NbSi, TaSi, TiSi) and High Temperature deposition (<450 C): Nitrides (InN, GaN, AlN, TiN, MoN, NbN, FeN), Oxides (MgO, Fe2O3), Tellurides (ZnTe, BiTe,), selenides (BiSe), Carbides (NbC). And any mix of the above mentioned compounds within a specific temperature range. These materials and alloys are relevant for applications such as solar cell, water splitting, superconductivity, passivation, detectors)

Results

Select results featuring dense wavy arrays of self-assembled colloidal fibers (colloidal fur) and permanent interconnected networks are displayed in FIG. 1. These structures can further be used as motifs for specific functionalization or coating, e.g. by atomic layer deposition (ALD).

Self-assembly at low degree of polymerization. At a low degree of polymerization the epoxy polymer/hardener mixture (for example, below 3 min) gives rise to liquid-like colloidal particles that produce smooth fiber structures when subjected to the ac electric field. Parallel retractable polymer fibers are formed at the electrode surfaces along the applied electric field. Depending on the parameters of the electric field, dynamic brushes of fine soft fibers, as seen in FIG. 1a, or bridges spanning the electrodes (FIG. 1e) are formed. Higher frequencies promote short, fine fibers while low frequencies result in long fibers gradually coalescing to thicker structures (FIG. 1e). Increasing the amplitude of the applied field favors more extended fibers.

At a higher degree of polymerization the mixture gives rise to "sticky" colloidal particles formed by epoxy polymers that are partially crosslinked to a higher degree than in a liquid-like colloid (see Methods). These sticky particles self-assemble into permanent structures. A few examples are shown in FIGS. 1b, d, f, g. Triggered and controlled by the external ac electric field at elevated frequencies (about 100 Hz), the system self-assembles to colloidal "fur": a dense brush of wavy fibers, see FIG. 1d. In this case, the field-induced hydrodynamic flow of the solvent is low and local arrangement of the polarizable particles is governed mostly by the head-to-tail electrostatic interactions. As one decreases the frequency, the hydrodynamics of the solvent comes into play, promoting formation of wavy fibers. Furthermore, depending on the parameters of the ac field, sticky epoxy particles assemble into interconnected chains (FIG. 1f) or tightly bundled networks of glued particles (FIG. 1g).

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method of creating a component comprising:
   providing a non-magnetic colloidal mixture of a particles in a liquid dielectric solvent;
   applying an alternating current electric field to the mixture; and
   forming a three-dimensional structure from the particles.

2. The method of claim 1, further comprising functionalizing the three-dimensional structure by depositing a substance on the structure.

3. The method of claim 1, wherein the particles are cross-linked epoxy particles.

4. The method of claim 3, further comprising forming the epoxy particles by quenching cross-linking of an epoxy polymer by a hardener upon addition of the liquid dielectric solvent.

5. The method of claim 4, wherein polymerization quenching occurs at a low degree of polymerization.

6. The method of claim 4, wherein polymerization quenching occurs at a high degree of polymerization.

7. The method of claim 1, wherein forming the three-dimensional structure comprises forming a structure selected from the group consisting of fibers, sticky epoxy particles, interconnected chains, and wavy fibers.

8. The method of claim 1 further comprising reversibly altering a dimension of the three-dimensional structure.

9. The method of claim 1 wherein the applied alternating current has an amplitude in the range of greater than 0 to about 1000 V.

10. The method of claim 8 wherein the applied alternating current amplitude is sufficient to favor the three-dimensional structure having extended fibers.

11. The method of claim 1 wherein the applied alternating current has a frequency in the range of 1 mHz to 1 MHz.

12. The method of claim 1, wherein the applied alternating current has a low frequency.

13. The method of claim 1, wherein the applied alternating current has a high frequency.

14. A method of creating a component comprising:
   providing an epoxy polymer;
   mixing the epoxy polymer with a hardener;
   initiating cross-linking of the epoxy polymer;
   quenching the cross-linking by mixing the epoxy polymer and hardener with a non-aqueous solvent;
   forming a colloid comprising particles of insoluble cross-linked epoxy molecules in the non-aqueous solvent;
   applying an alternating current electric field to the colloid; and
   forming a three-dimensional structure of the particles.

15. The method of claim 14, further comprising functionalizing the three-dimensional structure by depositing a substance on the structure.

16. The method of claim 14, wherein polymerization quenching occurs at a low degree of polymerization.

17. The method of claim 14, wherein polymerization quenching occurs at a high degree of polymerization.

18. The method of claim 14, wherein forming the three-dimensional structure comprises forming a structure selected from the group consisting of fibers, sticky epoxy particles, interconnected chains, and wavy fibers.

19. The method of claim 14 wherein the applied alternating current has an amplitude in the range of greater than 0 to about 1000 V.

20. The method of claim 14 wherein the applied alternating current has a frequency in the range of 1 mHz to 1 MHz.

* * * * *